United States Patent Office.

FRANZ GRAUPNER, OF EVANSVILLE, INDIANA.

Letters Patent No. 106,479, dated August 16, 1870.

IMPROVEMENT IN COMPOSITION TO BE USED IN DYEING.

The Schedule referred to in these Letters Patent and making part of the same

*To all whom it may concern:*

Be it known that I, FRANZ GRAUPNER, of Evansville, in the county of Vanderburg and State of Indiana, have invented a new and valuable Improvement in Coloring-Matter; and I do hereby declare that the following is a full, clear, and exact description of the construction and operation of the same, reference being had to the annexed drawing making a part of this specification, and to the letters and figures of reference marked thereon.

My invention has relation to dyeing, and consists in an improved coloring composition, having the nature of a mordant, and compounded as follows:

First, dissolve in an earthen vessel five and one-half pounds of sulphate of soda, with thirty-six pounds of warm water. Call this vessel No. 1.

Second, mix in another earthen vessel five pounds of sulphuric acid, with forty pounds of cold water. When cold, pour it into the first vessel.

In a third earthen vessel dissolve six pounds of oxalic acid in fifty pounds of warm water. When it is dissolved and cold, pour it into vessel No. 1.

In a fourth earthen vessel mix four and three-quarters pounds of muriatic acid with eleven ounces of nitric acid, and in this mixture dissolve pure English tin until saturation, in such a manner as not to raise the mixture above 60° Fahrenheit. When the solution will no longer take up the tin, (which will require about two days,) then add to it forty pounds of cold water, stir it well, and pour it into vessel No. 1.

Let the mixture stand a few hours, when it will be ready for use.

What I claim as my invention, and desire to secure by Letters Patent, is—

The coloring composition, herein described, as and for the purposes specified.

In testimony that I claim the above, I have hereunto subscribed my name in the presence of two witnesses.

FRANZ GRAUPNER.

Witnesses:
JAS. M. WARREN,
G. H. HAZEN.